US007926336B2

(12) United States Patent
Vickio, Jr. et al.

(10) Patent No.: US 7,926,336 B2
(45) Date of Patent: Apr. 19, 2011

(54) DYNAMOMETER

(76) Inventors: Louis P. Vickio, Jr., Houston, TX (US);
Louis P. Vickio, Sr., Watkins Glen, NY (US); Edward A. Vickio, Watkins Glen, NY (US)

(*) Notice: Subject to any disclaimer, the term of this patent is extended or adjusted under 35 U.S.C. 154(b) by 227 days.

(21) Appl. No.: 12/231,591

(22) Filed: Sep. 4, 2008

(65) Prior Publication Data
US 2010/0050759 A1   Mar. 4, 2010

(51) Int. Cl.
*G01M 15/00* (2006.01)
(52) U.S. Cl. ............... 73/116.05; 73/116.02; 73/116.06
(58) Field of Classification Search ............. 73/116.02, 73/116.05, 116.06
See application file for complete search history.

(56) References Cited

U.S. PATENT DOCUMENTS

| 3,977,240 | A | * | 8/1976 | Eichinger et al. | 73/116.05 |
| 5,515,712 | A | * | 5/1996 | Yunick | 73/9 |
| 6,651,493 | B2 | * | 11/2003 | Myers et al. | 73/116.05 |
| 6,918,287 | B2 | * | 7/2005 | Laws | 73/116.05 |
| 7,096,746 | B2 | * | 8/2006 | Kemnade | 73/862.191 |
| 7,610,799 | B2 | * | 11/2009 | Sugita | 73/114.15 |
| 2006/0106526 | A1 | * | 5/2006 | Sugita et al. | 701/114 |

* cited by examiner

*Primary Examiner* — Freddie Kirkland, III
(74) *Attorney, Agent, or Firm* — John R Casperson

(57) ABSTRACT

A dynamometer comprises a frame, an inertial flywheel, and a starter motor. The inertial flywheel is supported by the frame and the starter motor is movably mounted to the frame so as to be selectively engageable with the inertial flywheel. Means is provided for coupling an engine to be tested to the apparatus. The flywheel is brought up to speed by means of the starter motor and then coupled to the engine, which has been separately brought up to speed, via a clutch. The flywheel is supported by the frame in pressurized oil sleeve bearings.

15 Claims, 5 Drawing Sheets

DYNAMOMETER

FIELD OF THE INVENTION

In one aspect, the invention relates to a dynamometer for measuring a performance parameter for an internal combustion engine. In another aspect, the invention relates to a method for operating a dynamometer measuring a performance parameter for an internal combustion engine.

BACKGROUND OF THE INVENTION

Racing engines typically develop 750 to 1500 horsepower. They are almost always tested on a dynamometer prior to being delivered to a customer. Typical dynamometers have a complicated and expensive power absorbing and braking system to contain the power of the engine and cost on the order of $100,000. There is need for a less expensive dynamometer.

SUMMARY OF THE INVENTION

According to one embodiment of the invention, there is provided an apparatus comprising a frame, an inertial flywheel, and a starter motor. The inertial flywheel is supported by the frame and the starter motor is movably mounted to the frame so as to be selectively engageable with the inertial flywheel. Means is provided for coupling an engine to be tested to the apparatus.

In the invention, the power of the engine is absorbed by accelerating the inertial flywheel, which for a piston racing engine application would weigh on the order of a ton. Since metal is inexpensive, the inventive dynamometer can be made for less than dynamometers currently on the market. The movably mounted starter motor permits the massive inertial flywheel to be used by spinning it up to a speed compatible with the speed of the engine, prior to coupling the flywheel to the engine.

Another embodiment of the invention provides a method for obtaining data relevant to performance of an engine. In the inventive method, an engine output shaft is positioned for coupling to a massive inertial flywheel via a clutch assembly. Uplift is provided to a bottom side of the inertial flywheel as well as a pressurized oil feed to sleeve bearings supporting the inertial flywheel. The flywheel is then spun up to an rpm compatible with an rpm from the output shaft of the engine and the output shaft of the engine is coupled with the inertial flywheel via the clutch assembly. The flywheel is then accelerated with the engine and engine rpm is measured against time to obtain data for calculating engine horsepower and torque curves.

DETAILED DESCRIPTION OF THE INVENTION

It was recognized by the inventors that use of a massive inertial flywheel, for example, a solid 2,000 pound flywheel, in a dynamometer for racing engines had promise of reducing fabrication costs. However, two problems had to be overcome. The first was starting the engine against the massive inertia of the flywheel. The second was overcoming a bearing failure problem initiated when the flywheel began to move.

The first problem was solved by using, in an exemplary embodiment, a 10-HP electric motor with two air cylinders to lift and start the rotation of the inertia flywheel by overcoming the large break-away torque—-unique to this design The second problem was solved in an exemplary embodiment by using a sleeve oil bearing instead of roller bearings to support the weight of the flywheel. The inventive system in a preferred embodiment further uses an oil circulation pump system to supply the sleeve bearings with a constant bath of oil lubrication The inventive dynamometer can, in the exemplary embodiment, be self calibrated by use of a water brake which is used to slow down the inertial flywheel after a run.

Figure 1:
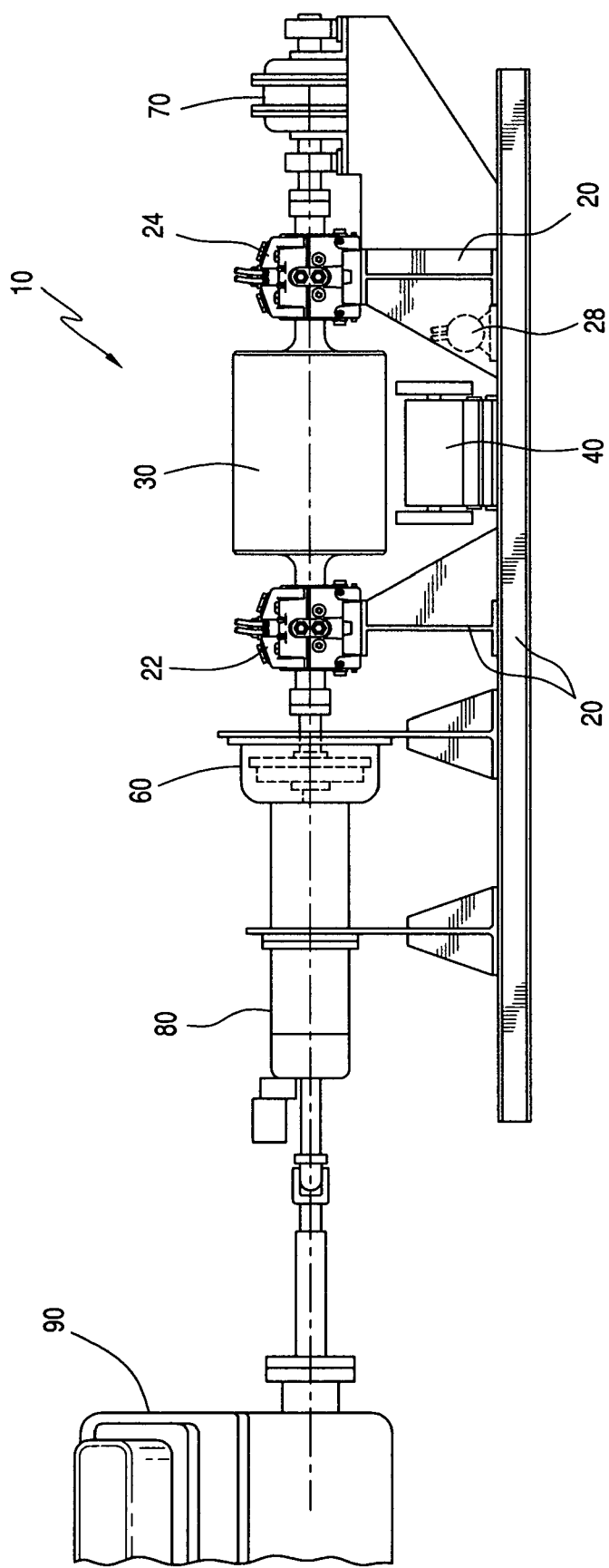
FIG. 1 is a side view, partly in schematic, showing certain features of an embodiment of the invention.
Figure 2:
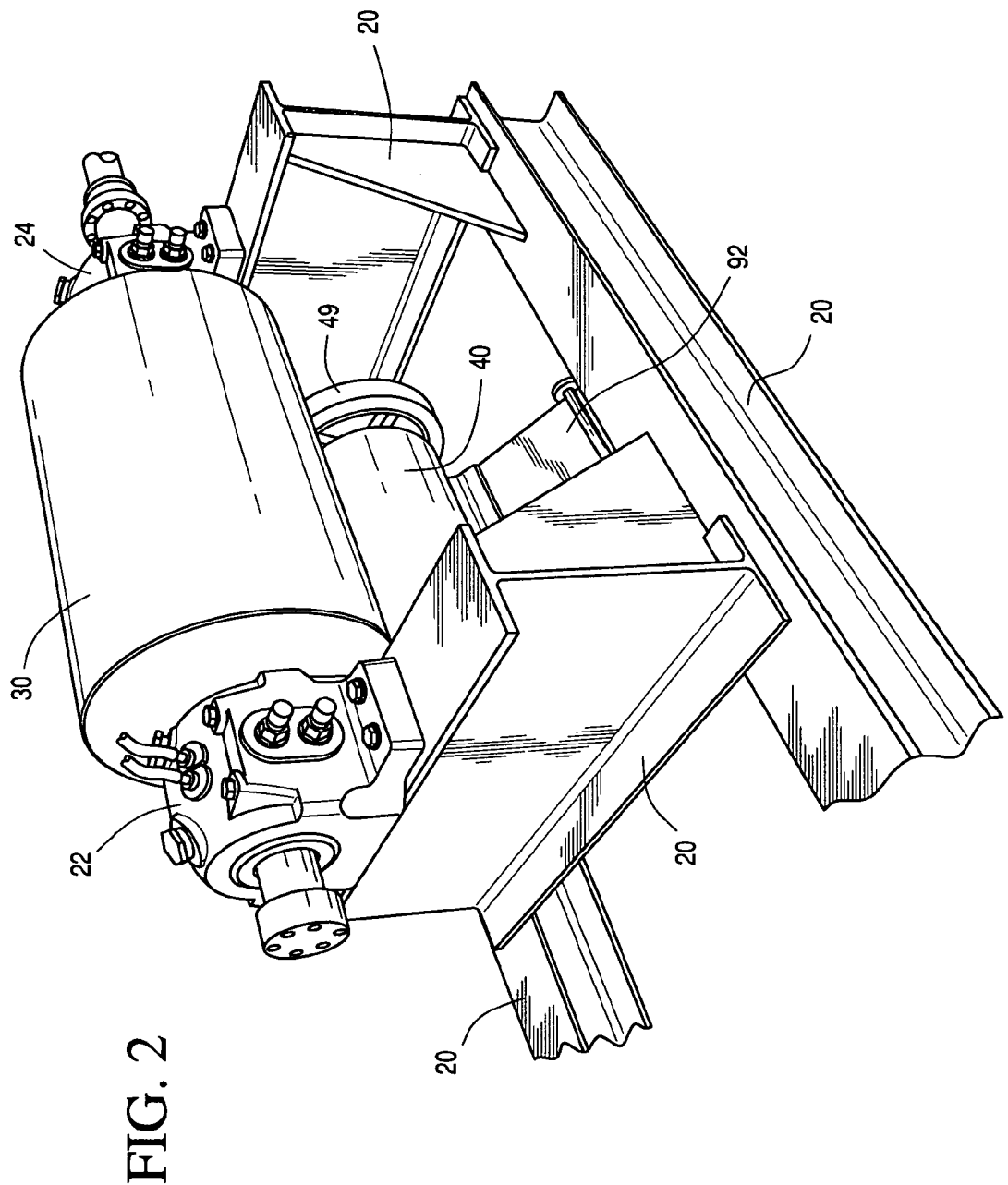
FIG. 2 is a pictorial view of a portion of the apparatus shown in FIG. 1, illustrating additional details.
Figure 5:
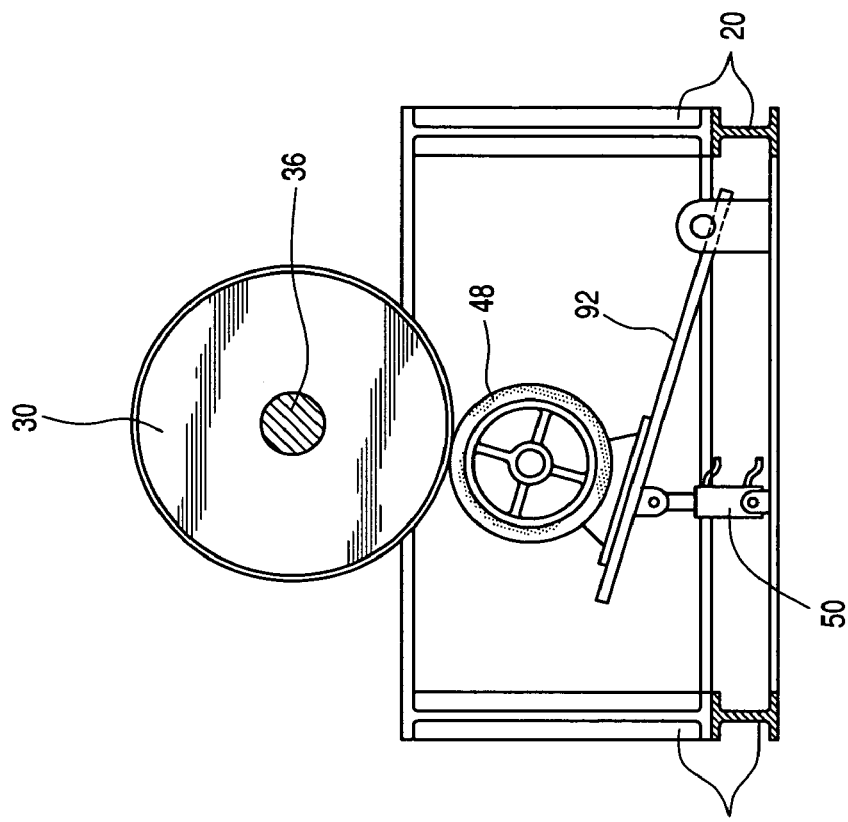
FIG. 5 is a cross sectional view of the apparatus shown in FIG. 3, along lines 5-5.

With reference to FIG. 1, an apparatus 10 comprises a frame 20, an inertial flywheel 30, and a starter motor 40. The inertial flywheel is supported by the frame and the starter motor is movably mounted to the frame so as to be selectively engageable with the inertial flywheel. See FIGS. 5 and 6, for example.

Figure 3:
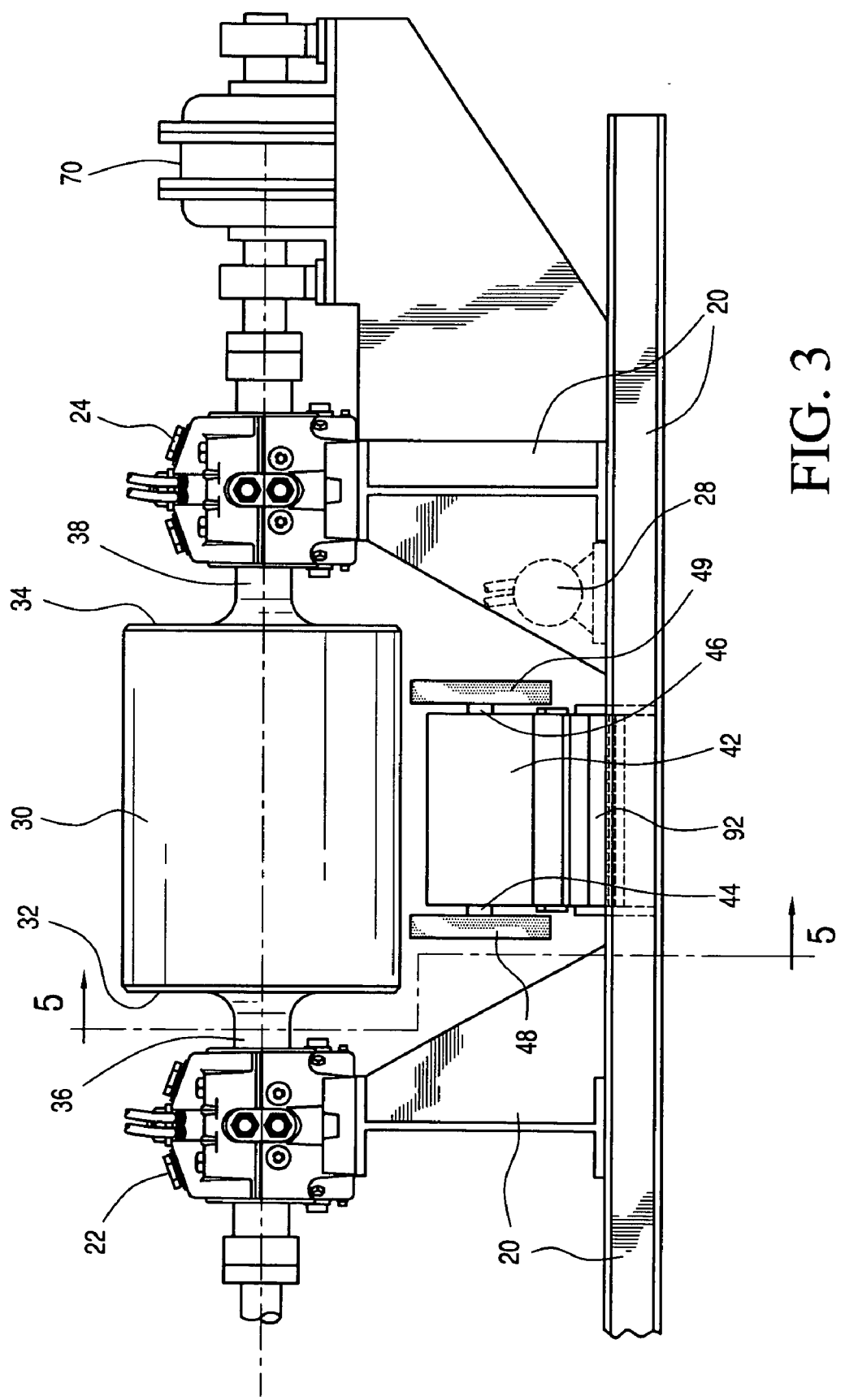
FIG. 3 is a side view of a portion of the apparatus shown in FIG. 1.

As best shown in FIG. 3, the inertial flywheel comprises a rotationally symmetric cylindrical body having a first end 32 and a second end 34. A first support shaft 36 extends axially from the first end and a second support shaft 38 extends axially from the second end. The frame 20 rotatably supports the inertial flywheel by the first support shaft and the second support shaft.

The starter motor generally comprises a generally cylindrical motor casing, an armature shaft protruding at least from one end of the casing, and at least one drive wheel mounted to the armature shaft. The starter motor preferably has a longitudinal axis which is positioned parallel to a longitudinal axis of the inertial flywheel, and is preferably vertically beneath the longitudinal axis of the flywheel. In the illustrated embodiment, the starter motor comprises a generally cylindrical motor casing 42 rotatably carrying an armature shaft. The armature shaft has a first end 44 protruding from the first end of the casing and a second end 46 protruding from a second end of the casing. The armature shaft first end carries a first drive wheel 48 and the second armature shaft end carries a second drive wheel 49. The first drive wheel and the second drive wheel are for engaging the cylindrical body of the inertial flywheel and transferring the rotational movement of the armature shaft to the rotational movement of the inertial flywheel.

Figure 4:
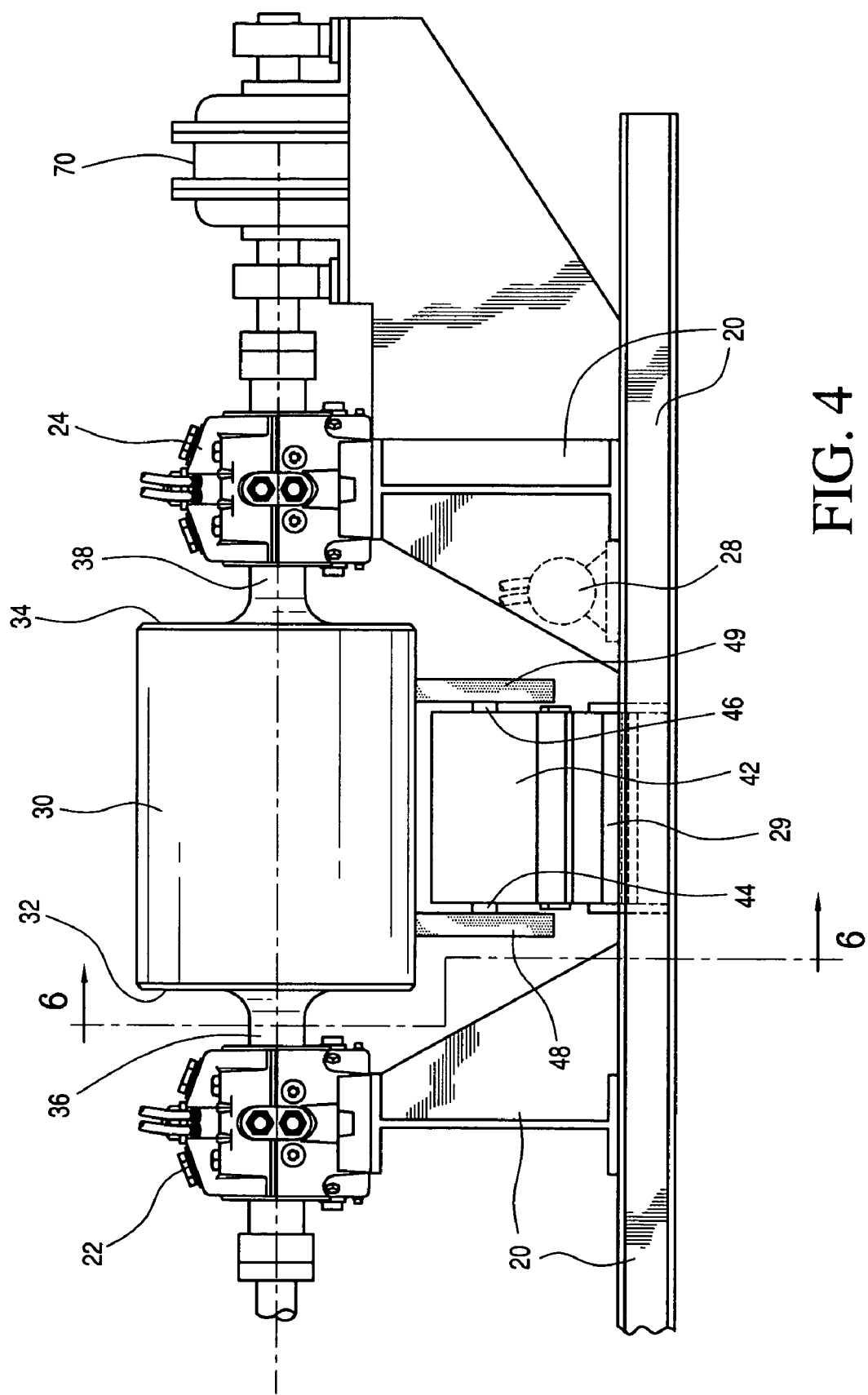
FIG. 4 is a side view of the apparatus shown in FIG. 3, in a different configuration.
Figure 6:
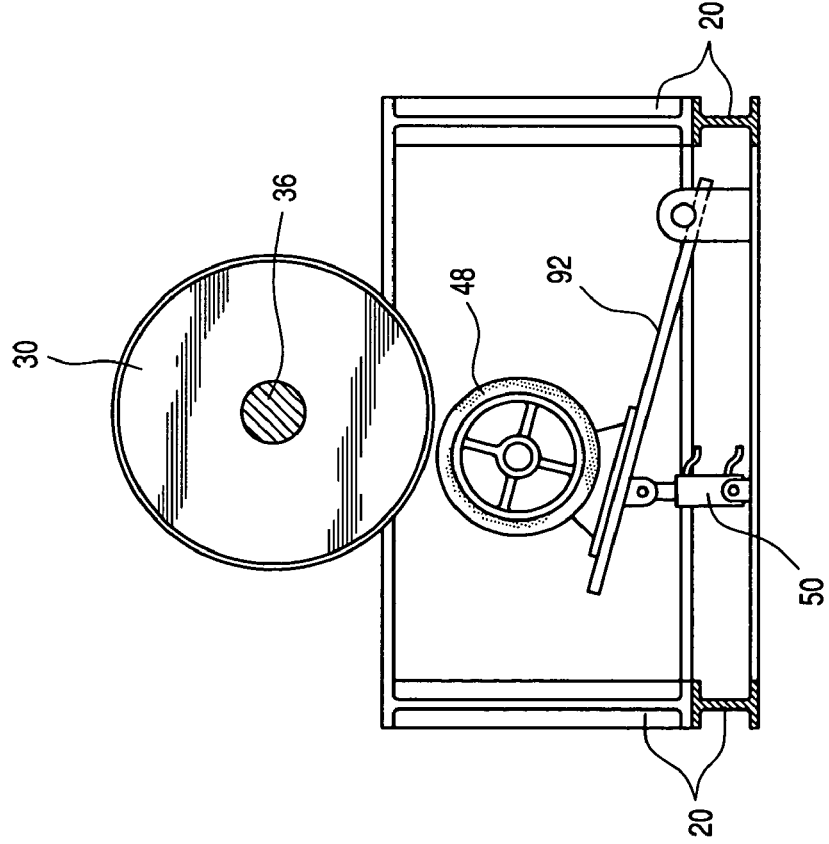
FIG. 6 is a cross sectional view of the apparatus shown in FIG. 4, along lines 6-6.

In accordance with one embodiment of the invention, at least one actuator (for example, air cylinder 50) is positioned between the frame and the motor casing to move the motor from a first position wherein the drive wheel is disengaged from the inertial flywheel (See FIGS. 3 and 5) to a second position wherein the drive wheel is engaged with the inertial flywheel (See FIGS. 4 and 6). Preferably, the at least one actuator moves the starter motor generally upwardly toward the longitudinal axis of the inertial flywheel. A pair of parallel air cylinders has been employed to position the starter motor with good results. In the illustrated embodiment, the starter motor is mounted atop a pivot plate 92 which is hingedly connected near a first plate edge to the frame. The parallel air cylinders are connected to the frame and a bottom side of the pivot plate to swing the plate and starter motor into and out of position to drive the inertia flywheel.

In the interests of preventing premature bearing failure during start-up, the actuator(s) preferably supply an upward force to the at least one drive wheel adequate to overcome at least ½ of the downward force caused by gravity acting on the inertial flywheel. More preferably, the actuator(s) supply an upward force to the at least one drive wheel adequate to overcome at least 90 percent of the downward force caused by gravity acting on the inertial flywheel. The apparatus preferably further comprises oiled sleeve blocks 22, 24 supporting the first support shaft and the second support shaft. Each oiled sleeve block comprises a sleeve for supporting a journal area of the support shaft. A pump 28 provides a flow of pressurized oil to the oiled sleeve block so that the journal areas of the support shaft ride on an oil film between the sleeve and the journal. Pump 28 can also be employed to provide pressurized oil to transmission 80 by use of a two stage pump housing. Pump 28 can draw from a two-compartment oil reservoir/cooler (not shown) positioned beneath the flywheel 30.

In use, a clutch assembly 60 is selectively operably associated with the first support shaft and a brake assembly 70 is selectively operably associated with the second support shaft. A transmission 80 is operably connected to the clutch assembly and an engine 90 is operably connected to the transmission.

In another embodiment of the invention there is provided a method for obtaining data relevant to performance of an engine. In the inventive method, an engine output shaft is positioned for coupling to a massive inertial flywheel via a clutch assembly. Uplift is provided to a bottom side of the inertial flywheel as well as a pressurized oil feed to sleeve bearings supporting the inertial flywheel. The flywheel is then spun up to an rpm compatible with an rpm from the output shaft of the engine and the output shaft of the engine is coupled with the inertial flywheel via the clutch assembly. The flywheel is then accelerated with the engine and the engine rpm is measured against time to obtain data for calculating engine horsepower and torque curves.

For piston automotive racing engines, the flywheel will usually have a mass in the range of 500 to 1500 kg, typically about 900 kg. The flywheel will be spun, prior to coupling with the engine, to an rpm in the range of 500 to 1500 rpm, typically about 1200 rpm. The flywheel will be brought up to speed by coupling the flywheel to a 2 to 10 KW electric motor, typically about a 7.5 KW motor, acting on an outer surface of the flywheel. Uplift will be provided to the bottom side of the flywheel by pneumatic actuators urging the electric motor vertically upwards toward the flywheel.

Once data has been obtained from a run, the engine can be throttled back and then decoupled from the flywheel. If desired, the flywheel can be decelerated and its rpm measured against time to obtain data for calculating frictional losses for calibration purposes. The flywheel can be permitted to coast down in rpm under no load conditions for this purpose, or it can be braked with a device of known resistance or one for performing measurable work such as a water brake or a generator.

In an exemplary embodiment of the invention, a 2,000 pound inertia flywheel is started by use of a 10 HP electric motor and two air cylinders. The electric motor is mounted to a swivel base. The oil pump is started. The air to the cylinders is adjusted to overcome the weight of the 2,000 lb inertia flywheel by pushing the 10 HP electric motor and two 10 inch drive wheels attached to each end of the electric motor up against the inertia flywheel. The electric motor assembly sits on a swivel base to allow movement to and from the inertia flywheel. Once the weight of the inertia flywheel is overcome the electric motor starts to rotate the inertia flywheel into motion. Once this is achieved an oil film is present between the weight and bearing and will rotate with very little friction and is ready for running the dyno test. Baldor Electric Company, Dodge/Reliance Division makes Dodge® Sleevoil® RTL pillow blocks that are suitable for supporting the flywheel. The electric motor is capable of spinning the inertia flywheel up to 1,200 rpm to allow easy engagement of the engine to the inertia flywheel by use of a clutch. Once the engine is engaged the apparatus is ready to make a test run. The motor can be coupled to the inertia flywheel via a two-speed Lenco transmission with a toothed flywheel, starter motor and internal clutch coupled to a pressure plate/clutch assembly encased in an explosion proof bell housing.

By use of computer controls and speed feed back devices, the engine and the inertia flywheel is ramped up to a certain rpm as time is recorded to give us the data needed to calculate horsepower and torque curves. The engine is throttled back to an idle and the inertia flywheel is disengaged by use of the clutch letting the inertia flywheel free wheel and be slowed down to 1,200 rpm by use of the water brake. The system is now ready for another run.

Also by spinning the inertia flywheel to a certain rpm then using a known force (water brake) to bring it to a stop you can back calculate exact friction losses to accurately calibrate the system for precise performance.

While certain preferred embodiments of the invention have been described herein, the invention is not to be construed as being so limited, except to the extent that such limitations are found in the claims.

What is claimed is:

1. Apparatus comprising
   a) a frame
   b) a massive inertial flywheel having a mass in the range of 500 to 1500 kg supported by the frame; and
   c) a starter motor movably mounted to the frame so as to be selectively engageable with the inertial flywheel;
   wherein the inertial flywheel comprises a rotationally symmetric cylindrical body having a first end and a second end, a first support shaft extending axially from the first end and a second support shaft extending axially from the second end, said frame rotatably supporting the inertial flywheel by the first support shaft and the second support shaft; and
   wherein the frame further comprises
   a first oiled sleeve block supporting the first support shaft and a second oiled sleeve block supporting the second support shaft,
   said apparatus further comprising
   a means for pumping oil to the first oiled sleeve block and the second oiled sleeve block so that journal areas of the support shaft ride on an oil film.

2. Apparatus as in claim 1 further comprising a clutch assembly selectively operably associated with the first support shaft and a brake assembly selectively operably associated with the second support shaft.

3. Apparatus as in claim 2 further comprising a transmission operably connected to the clutch assembly and an engine operably connected to the transmission.

4. Apparatus comprising
   a) a frame
   b) an inertial flywheel supported by the frame; and
   c) a starter motor movably mounted to the frame so as to be selectively engageable with the inertial flywheel;
   wherein
   the inertial flywheel comprises a rotationally symmetric cylindrical body having a first end and a second end, a first support shaft extending axially from the first end and a second support shaft extending axially from the second end, said frame rotatably supporting the inertial flywheel by the first support shaft and the second support shaft, and wherein the starter motor comprises a generally cylindrical motor casing rotatably carrying an armature shaft, said armature shaft having a first end protruding from the first end of the casing and a second end protruding from a second end of the casing, said first armature shaft end carrying a first drive wheel, said second armature shaft end carrying a second drive wheel, said first drive wheel and said second drive wheel for engaging the cylindrical body of the inertial flywheel and transferring rotational movement of the armature shaft to rotational movement of the inertial flywheel.

5. Apparatus comprising
a) a frame
b) a massive inertial flywheel having a mass in the range of 500 to 1500 kg supported by the frame, said flywheel having a longitudinal axis;
c) a starter motor including a base movably mounted to the frame so as to be selectively engageable with the inertial flywheel and,
at least one linear actuator connected to the frame and the starter motor base to selectively move the starter motor base, starter motor, and at least one drive wheel carried by the starter motor generally radially toward the longitudinal axis of the flywheel to engage the inertial flywheel,
wherein the starter motor has a longitudinal axis which is positioned parallel to a longitudinal axis of the inertial flywheel, said starter motor selectively engaging the flywheel via the at least one drive wheel, said drive wheel being positioned beneath the flywheel and being coupled to at least one actuator via the starter motor and base to move with the starter motor generally radially toward the flywheel to and provide uplift to the flywheel.

6. Apparatus as in claim 5
wherein the starter motor comprises a generally cylindrical motor casing, an armature shaft protruding at least from one end of the casing, and at least one drive wheel mounted to the armature shaft,
and the
at least one actuator connected to the frame and to the starter motor base moves the starter motor from a first position wherein the drive wheel is disengaged from the inertial flywheel to a second position wherein the drive wheel is engaged with the inertial flywheel.

7. Apparatus as in claim 6 wherein the starter motor has a longitudinal axis which is positioned vertically beneath the longitudinal axis of the inertial flywheel.

8. Apparatus as in claim 7 wherein the at least one linear actuator comprises a pair of pneumatic cylinders which supply an upward force to the at least one drive wheel adequate to overcome at least 90 percent of the downward force supplied by gravity acting on the inertial flywheel.

9. Apparatus comprising
a) a frame
b) an inertial flywheel supported by the frame; and
c) a starter motor movably mounted to the frame so as to be selectively engageable with the inertial flywheel;
wherein the starter motor has a longitudinal axis which is positioned parallel to a longitudinal axis of the inertial flywheel;
wherein the starter motor comprises a generally cylindrical motor casing, an armature shaft protruding at least from one end of the casing, and at least one drive wheel mounted to the armature shaft, said apparatus further comprising
a starter motor base on which the starter motor is mounted, and
at least one actuator connected to the frame and to the starter motor base to move the motor from a first position wherein the drive wheel is disengaged from the inertial flywheel to a second position wherein the drive wheel is engaged with the inertial flywheel;
wherein the actuator comprises a linear actuator that moves the starter motor generally radially with respect to the longitudinal axis of the inertial flywheel;
wherein the starter motor has a longitudinal axis which is positioned vertically beneath the longitudinal axis of the inertial flywheel; and
wherein the at least one linear actuator comprises a pair of pneumatic cylinders each having a first end and a second end and each being pivotally connected to the frame by their first end and pivotally connected to the starter motor base by their second ends, and the starter motor base comprises a generally rectangular plate hingedly connected to the frame along one edge thereof and carrying the starter motor generally between the connection points of the pair of pneumatic cylinders, the longitudinal axis of the starter motor being generally parallel to the axis of the hinge.

10. A method for starting a dynamometer to obtain data relevant to engine performance, said method comprising
positioning an output shaft from the engine for coupling to a massive inertial flywheel via a clutch assembly,
providing an electric starter motor having at least one drive wheel engaging the massive inertial flywheel from beneath,
providing uplift to a bottom side of the inertial flywheel by urging the electric starter motor radially toward a longitudinal axis of the inertial flywheel,
providing a pressurized oil feed to sleeve bearings supporting the inertial flywheel, spinning the flywheel up to an rpm compatible with an rpm from the output shaft of the engine,
wherein the flywheel is spun up by rotating the at least one starter motor drive wheel urged vertically upward against the inertial flywheel to provide the uplift to the bottom side of the inertial flywheel;
coupling the output shaft of the engine with the inertial flywheel via the clutch assembly; and
accelerating the flywheel with the engine and measuring engine rpm against time to obtain data for calculating engine horsepower and torque curves.

11. A method as in claim 10 further comprising
throttling back the engine, and
decoupling the engine from the flywheel.

12. A method for obtaining data relevant to engine performance,
said method comprising
positioning an output shaft from the engine for coupling to a massive inertial flywheel via a clutch assembly,
providing uplift to a bottom side of the inertial flywheel,
providing a pressurized oil feed to sleeve bearings supporting the inertial flywheel, spinning the flywheel up to an rpm compatible with an rpm from the output shaft of the engine,
coupling the output shaft of the engine with the inertial flywheel via the clutch assembly; and
accelerating the flywheel with the engine and measuring engine rpm against time to obtain data for calculating engine horsepower and torque curves,
throttling back the engine, decoupling the engine from the flywheel, and decelerating the flywheel and measuring flywheel rpm against time to obtain data for calculating frictional losses for calibration purposes.

13. A method as in claim 12 wherein the flywheel is decelerating by coupling it to a braking device selected from the group consisting of a water brake and a generator.

14. A method as in claim 10 wherein the flywheel has a mass in the range of 500 to 1500 kg, the flywheel is spun, prior to coupling with the engine, to an rpm in the range of 500 to 1500 rpm, by coupling the flywheel to a 2 to 10 KW electric motor acting on an outer surface of the flywheel via a pair of drive wheels, and the uplift to the bottom side of the flywheel is provided by pneumatic actuators urging the electric motor vertically upwards toward the flywheel.

15. A method for obtaining data relevant to engine performance, said method comprising positioning an output shaft from the engine for coupling to a massive inertial flywheel via a clutch assembly, providing uplift to a bottom side of the inertial flywheel, providing a pressurized oil feed to sleeve bearings supporting the inertial flywheel, spinning the flywheel up to an rpm compatible with an rpm from the output shaft of the engine, coupling the output shaft of the engine with the inertial flywheel via the clutch assembly; and accelerating the flywheel with the engine and measuring engine rpm against time to obtain data for calculating engine horsepower and torque curves;

wherein the uplift to the bottom side of the flywheel is provided by introducing a pressurized oil stream beneath a pair of journals supporting the flywheel.

* * * * *